United States Patent
Inoue et al.

(10) Patent No.: US 7,678,019 B2
(45) Date of Patent: Mar. 16, 2010

(54) CONTROL DEVICE AND CONTROL METHOD FOR FRICTION ENGAGEMENT ELEMENT

(75) Inventors: Daisuke Inoue, Toyota (JP); Tadashi Tamura, Nishikamo-gun (JP); Hiroji Taniguchi, Okazaki (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 601 days.

(21) Appl. No.: 11/529,343

(22) Filed: Sep. 29, 2006

(65) Prior Publication Data

US 2007/0089957 A1   Apr. 26, 2007

(30) Foreign Application Priority Data

Oct. 21, 2005 (JP) .............................. 2005-307374

(51) Int. Cl.
 *F16H 61/14* (2006.01)
 *B60W 10/02* (2006.01)
(52) U.S. Cl. .................. 477/168; 477/169; 477/174; 477/175; 477/180

(58) Field of Classification Search ................ 192/3.29; 477/168, 169, 174, 175, 180
See application file for complete search history.

(56) References Cited

U.S. PATENT DOCUMENTS

| 5,029,087 | A | * | 7/1991 | Cowan et al. ................. 701/68 |
| 5,626,535 | A | * | 5/1997 | Kono et al. ................. 477/169 |
| 5,938,563 | A | * | 8/1999 | Nishio et al. ................. 477/117 |
| 7,207,924 | B2 | * | 4/2007 | Cullen et al. ................. 477/111 |

FOREIGN PATENT DOCUMENTS

JP    7-180766    7/1995

\* cited by examiner

*Primary Examiner*—Tisha D Lewis
(74) *Attorney, Agent, or Firm*—Oblon, Spivak, McClelland, Maier & Neustadt, L.L.P.

(57) ABSTRACT

An ECT_ECU executes a program including the step of prohibiting a lockup clutch from engaging if the lockup clutch is disengaged and a number of revolutions or speed NE of an input shaft of a torque converter minus a number of revolutions or speed NT of an output shaft of the torque converter is smaller than a threshold value $\Delta N (1)$.

6 Claims, 4 Drawing Sheets

F I G. 1
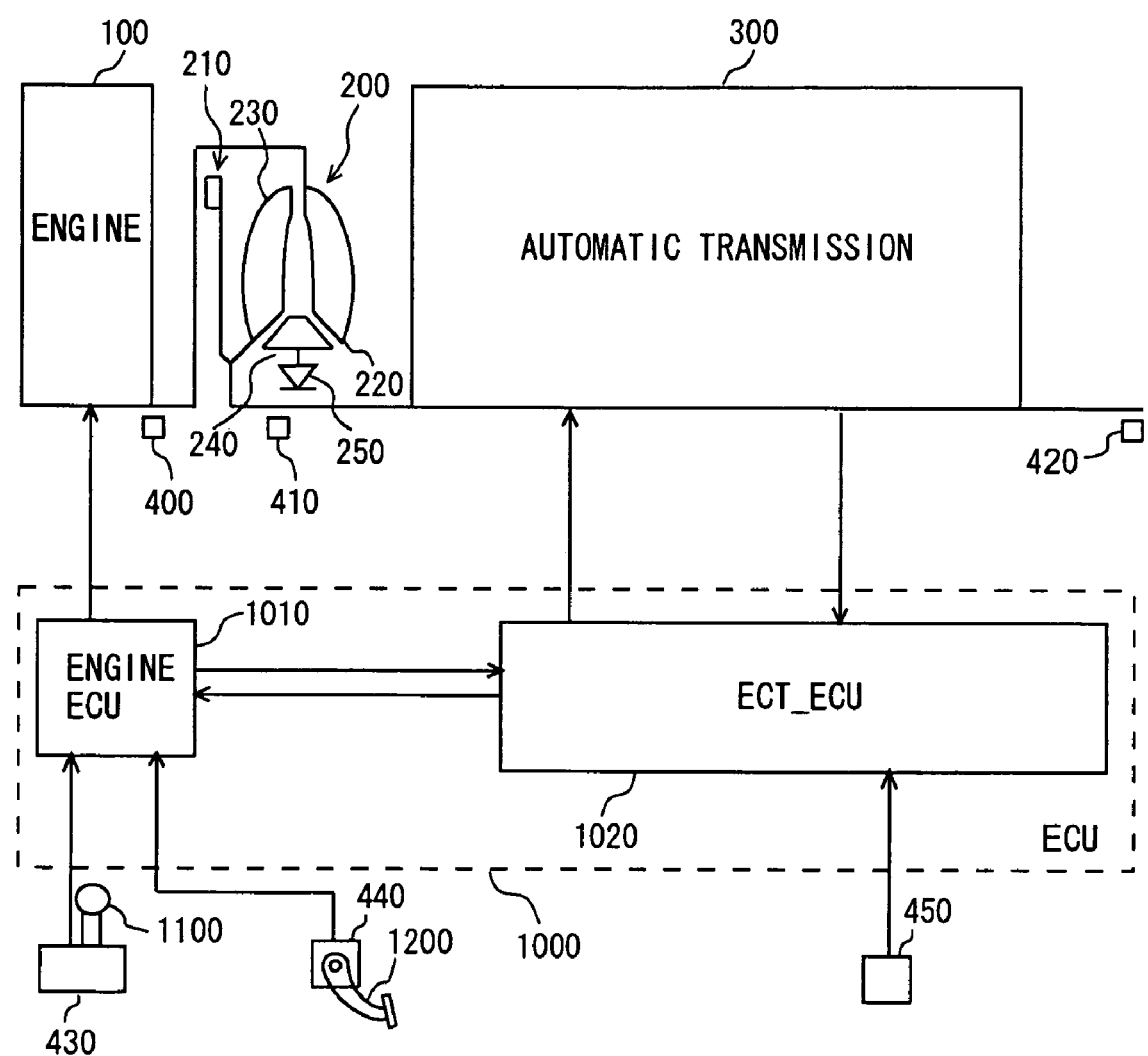

CONTROL DEVICE AND CONTROL METHOD FOR FRICTION ENGAGEMENT ELEMENT

This nonprovisional application is based on Japanese Patent Application No. 2005-307374 filed with the Japan Patent Office on Oct. 21, 2005, the entire contents of which are hereby incorporated by reference.

BACKGROUND OF THE INVENTION

1. Field of the Invention

The present invention relates generally to control devices and control method for friction engagement elements and particularly to the technology applied to control a friction engagement element provided internal to a fluid coupling that couples a power source and a transmission together to allow the fluid coupling to have its input and output shafts mechanically coupled together.

2. Description of the Background Art

Conventionally some transmissions (automatic transmissions in particular) are coupled to an engine via a torque converter or a similar fluid coupling. The torque converter receives a driving force from the engine and transmits the driving force to the transmission via oil or a similar fluid circulating through the torque converter. This provides the torque converter's input and output shafts with different numbers of revolutions (or speeds), respectively. In such case, the driving force can be transmitted inefficiently. Accordingly, a lockup clutch or a similar friction engagement element is provided to allow the torque converter to have its input and output shafts mechanically coupled together.

Japanese Patent Laying-Open No. 07-180766 discloses a device controlling force for engagement for a fluid coupling (a torque converter) provided with a lockup clutch. As described in the publication, the device controls the force for engagement for the fluid coupling for a transmission that is provided with a rotative driving member rotatably driven by an engine, a rotative driven member rotatively driven by the rotative driving member hydraulically, a lockup clutch capable of engaging the rotative members together by a force for engagement depending on a differential fluid pressure exerted, and a control unit controlling the force engaging the lockup clutch for an operation state falling within a predetermined range subject to controlling the force for engagement. This device includes a transmission delay unit. When the operation state is no longer within the predetermined range and the control unit withdraws from controlling the force engaging the lockup clutch, and successively there arises a condition requiring transmission, then the transmission delay unit delays the start of the transmission by a predetermined period of time.

A torque converter transmits a driving force by automatic transmission fluid (ATF) flowing between a pump impeller connected to the input shaft and a turbine runner connected to the output shaft. Accordingly, how the pump impeller and the turbine runner rotate can determine in which direction in the torque converter the ATF flows. Herein, in general, a lockup clutch is provided between the converter's cover and the turbine runner and engaged with the converter's cover to allow the torque converter to have its input and output shafts directly connected together. Accordingly, if the ATF flows from the pump impeller toward the turbine runner, it will cause a force acting in a direction to push the lockup clutch against the converter's cover (or increase the force for engagement). In contrast, if the ATF flows from the turbine runner toward the pump impeller, it will cause a force acting in a direction to pull the lockup clutch away from the converter's cover (or decrease the force for engagement). Accordingly for example if the engagement of the lockup clutch is being controlled (i.e., the lockup clutch transitions from disengagement to engagement), and the flow of the ATF varies in direction from the direction allowing the force pulling the lockup clutch away from the converter's cover to act to the direction allowing the force pushing the lockup clutch against the converter's cover to act, the lockup clutch can rapidly be engaged and hence cause shock resulting in poor drivability. Japanese Patent Laying-Open No. 07-180766, however, describes the device without considering such shock caused as the ATF flows in a varied direction.

SUMMARY OF THE INVENTION

The present invention contemplates a control device and control method for a friction engagement element (a lockup clutch) that is capable of alleviating/preventing poor drivability caused as the friction engagement element is rapidly engaged.

The present invention in one aspect provides a control device controlling a friction engagement element provided internal to a fluid coupling that couples a power source and a transmission together to allow the fluid coupling to have its input and output shafts mechanically coupled together. The control device includes an operation unit. The operation unit controls a state of the friction engagement element. The operation unit determines whether the friction engagement element is disengaged, and if the friction engagement element is disengaged and a number of revolutions (or speed) of the input shaft of the fluid coupling and that of revolutions (or speed) of the output shaft of the fluid coupling satisfy a predetermined relationship, the operation unit prohibits the friction engagement element from engaging.

In accordance with the present invention a friction engagement element is provided internal to a fluid coupling that couples a power source and a transmission together to allow the fluid coupling to have its input and output shafts mechanically coupled together. When the fluid coupling has the output shaft revolving at a speed higher than the input shaft (i.e., the output shaft rotating ahead of the input shaft), the fluid coupling has its internal fluid flowing from the output shaft toward the input shaft and a force decreasing the force engaging the friction engagement element (or a force preventing such engagement) can act. In contrast, when the fluid coupling has the input shaft rotating at a speed higher than the output shaft (i.e., the input shaft rotating ahead of the output shaft), the fluid coupling has its internal fluid flowing from the input shaft toward the output shaft and a force increasing the force engaging the friction engagement element (or a force facilitating such engagement) can act. Thus if the friction engagement element is shifted from disengagement to engagement and the flow of the fluid varies in direction from a direction allowing the force decreasing the force engaging the friction engagement element to act to a direction allowing the force increasing the force engaging the friction engagement element to act, the force engaging the friction engagement element can rapidly increase. This can cause the friction engagement element to rapidly engage, and thus cause shock. Accordingly if the friction engagement element is disengaged and the number of revolutions of the input shaft of the fluid coupling and that of revolutions of the output shaft of the fluid coupling for example satisfy such a relationship that the latter is larger than the former, then engaging the friction engagement element is prohibited. The friction engagement element can thus be maintained disengaged. This can alleviate or prevent the force engaging the friction engagement element rapidly increasing as the flow of the fluid rapidly varies while the friction engagement element is transitioning from disengagement to engagement. The control device for the friction engagement element can thus alleviate or prevent poor drivability caused as the friction engagement element rapidly engages.

Preferably the predetermined relationship is that the number of revolutions of the output shaft of the fluid coupling is larger than that of revolutions of the input shaft of the fluid coupling.

In accordance with the present invention if the friction engagement element is disengaged and the number of revolutions of the output shaft of the fluid coupling is larger than that of the input shaft of the fluid coupling, engaging the friction engagement element is prohibited. The friction engagement element can thus be maintained disengaged. This can alleviate or prevent the force engaging the friction engagement element rapidly increasing as the flow of the fluid rapidly varies while the friction engagement element is transitioning from disengagement to engagement. This can prevent the friction engagement element from rapidly engaging and hence alleviate/prevent poor drivability.

The present invention in another aspect provides a control device controlling a friction engagement element provided internal to a fluid coupling that couples a power source and a transmission together to allow the fluid coupling to have its input and output shafts mechanically coupled together. The control device includes an operation unit. The operation unit controls a state of the friction engagement element. The operation unit determines whether the friction engagement element is disengaged, and if the friction engagement element is disengaged and a number of revolutions of the input shaft of the fluid coupling continues to be larger than that of revolutions of the output shaft of the fluid coupling for a period of time shorter than a predetermined period of time, the operation unit prohibits the friction engagement element from engaging.

In accordance with the present invention a friction engagement element is provided internal to a fluid coupling that couples a power source and a transmission together to allow the fluid coupling to have its input and output shafts mechanically coupled together. When the fluid coupling has the output shaft rotating at a speed higher than the input shaft (i.e., the output shaft rotating ahead of the input shaft), the fluid coupling has its internal fluid flowing from the output shaft toward the input shaft and a force decreasing the force engaging the friction engagement element (or a force preventing such engagement) can act. In contrast, if the fluid coupling has the input shaft rotating at a speed higher than the output shaft (i.e., the input shaft rotating ahead of the output shaft), the fluid coupling has its internal fluid flowing from the input shaft toward the output shaft and a force increasing the force engaging the friction engagement element (or a force facilitating such engagement) can act. Thus if the friction engagement element is shifted from disengagement to engagement and the flow of the fluid varies in direction from a direction allowing the force decreasing the force engaging the friction engagement element to act to a direction allowing the force increasing the force engaging the friction engagement element to act, the force engaging the friction engagement element can rapidly increase. This can cause the friction engagement element to rapidly engage, and thus cause shock. Accordingly if the friction engagement element is disengaged and the number of revolutions of the input shaft of the fluid coupling continues to be larger than that of revolutions of the output shaft of the fluid coupling for a period of time shorter than a predetermined period of time, the friction engagement element is prohibited from engaging. Thus if it can be said that the fluid has varied in direction to flow in a direction allowing the force engaging the friction engagement element to be increased, and the flow of the fluid is considered still unstable in direction, the friction engagement element can be maintained disengaged. This can alleviate or prevent the force engaging the friction engagement element rapidly increasing as the flow of the fluid rapidly varies while the friction engagement element is transitioning from disengagement to engagement. The control device for the friction engagement element can thus alleviate or prevent poor drivability caused as the friction engagement element rapidly engages.

Preferably the operation unit permits the friction engagement element to engage if the friction engagement element is disengaged and the number of revolutions of the input shaft of the fluid coupling continues to be larger than that of revolutions of the output shaft of the fluid coupling for at least the predetermined period of time.

In accordance with the present invention, engaging the friction engagement element is permitted if the friction engagement element is disengaged and the number of revolutions of the input shaft of the fluid coupling continues to be larger than that of revolutions of the output shaft of the fluid coupling for at least the predetermined period of time. Thus in a condition with the flow of the fluid stable in direction, engaging the friction engagement element can be started. This can alleviate or prevent the force engaging the friction engagement element rapidly increasing as the flow of the fluid rapidly varies while the friction engagement element is transitioning from disengagement to engagement. This can prevent the friction engagement element from rapidly engaging and hence alleviate/prevent poor drivability.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 schematically shows a configuration of a power train of a vehicle having a control device mounted therein in accordance with an embodiment.

DESCRIPTION OF THE PREFERRED EMBODIMENTS

Figure 2:
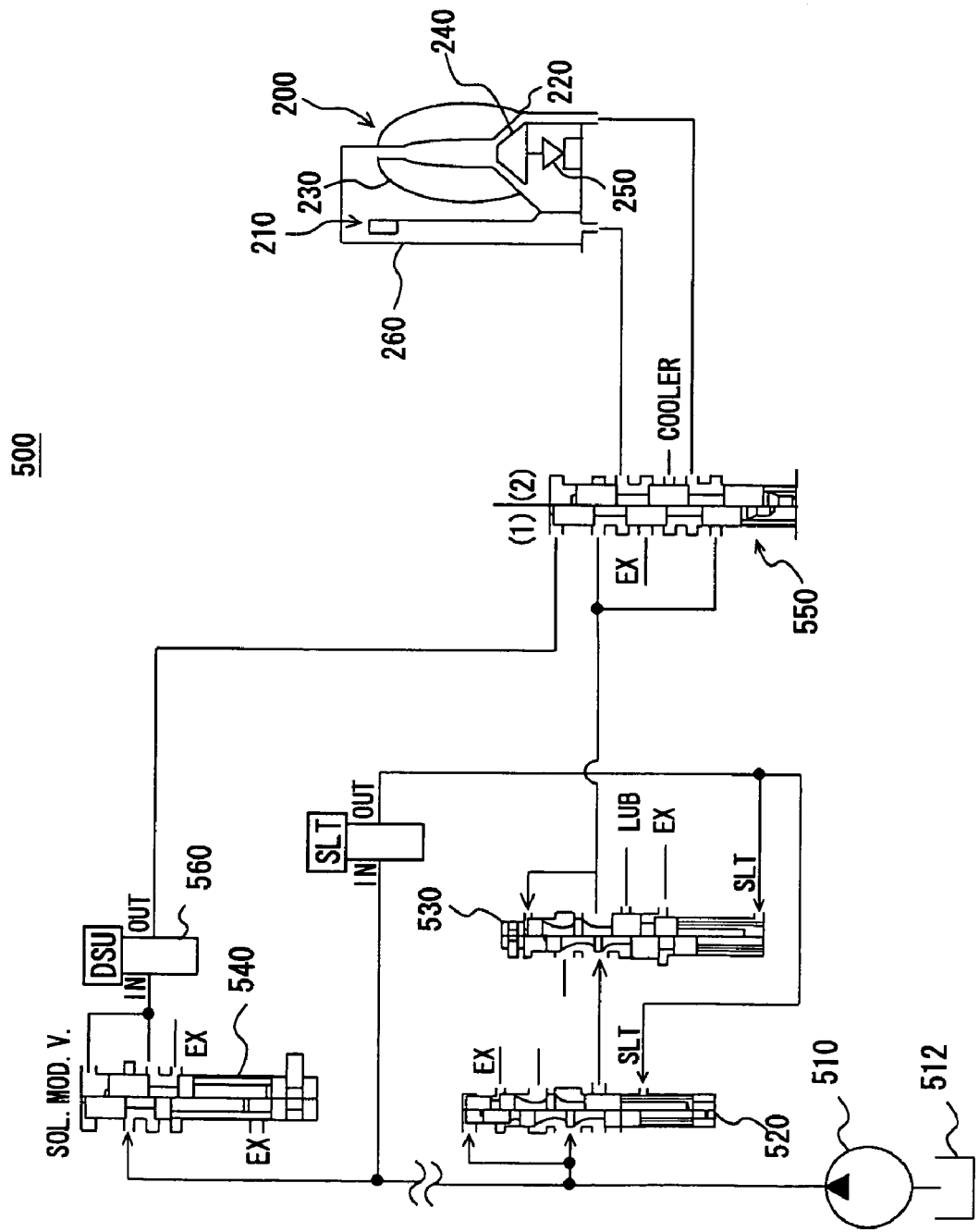
FIG. 2 shows a hydraulic circuit adjusting hydraulic pressure provided to a torque converter to control the state of a lockup clutch.

Hereinafter reference will be made to the drawings to describe an embodiment of the present invention. In the following description, identical components are identically denoted. They are also identical in name and function. Accordingly, they will not be described repeatedly.

With reference to FIG. 1, the present embodiment provides a control device mounted in a vehicle having a power train as will be described hereinafter. In the present embodiment the control device is implemented by an electronic control unit (ECU) 1000 shown in FIG. 1. More specifically, it is implemented by a program executed by an electronic controlled transmission (ECT)_ECU 1020 included in ECU 1000.

As shown in FIG. 1, this vehicle's power train is configured of an engine 100, a torque converter 200, an automatic transmission 300, and ECU 1000.

Engine 100 has an output shaft connected to an input shaft of torque converter 200. Engine 100 and torque converter 200 are coupled by a rotation shaft. Accordingly, the number of revolutions (or speed) NE of the output shaft of engine 100 (or the number of revolutions (or speed) NE of the engine), which is detected by a sensor 400 sensing the number of revolutions of the engine, is equal to that of revolutions (or speed) of the input shaft of torque converter 200 (or the number of revolutions (or speed) of a pump).

Torque converter 200 is configured of a lockup clutch 210 allowing the input and output shafts to be directly connected together, a pump impeller 220 associated with the input shaft, a turbine runner 230 associated with the output shaft, and a stator 240 having a one way clutch 250 to exhibit a torque amplifying function.

Torque converter 200 and automatic transmission 300 are connected by a rotation shaft. The number of revolutions (or speed) NT of the output shaft of torque converter 200 (the number of revolutions (or speed) NT of the turbine) is detected by a sensor 410 sensing the number of revolutions of the turbine. The number of revolutions (or speed) NOUT of the output shaft of automatic transmission 300 is detected by a sensor 420 sensing the number of revolutions (or speed) of the output shaft.

Automatic transmission 300 may be a transmission having a gear implemented by a planetary gear unit or may be a continuously variable transmission (CVT) gearlessly varying a transmission ratio.

The power train is controlled by ECU 1000, which includes an engine ECU 1010 controlling engine 100, and an ECT_ECU 1020 controlling the automatic transmission.

ECT_ECU 1020 receives from sensor 410 a signal indicating the number of revolutions NT of the turbine, and from sensor 420 a signal indicating the number of revolutions (or speed) NOUT of the output shaft. Furthermore, ECT_ECU 1020 receives from engine ECU 1010 a signal indicating the number of revolutions NE of the engine as detected by sensor 400, a signal indicating a throttle angle as detected by a throttle position sensor, a signal indicating the position of a shift lever 1100 as detected by a shift position sensor 430, a signal indicating in amount how an accelerator pedal 1200 is stepped down, as detected by an acceleration pedal position sensor 440, and a signal indicating a vehicle speed as detected by a vehicle speed sensor 450. ECT_ECU 1020 operates in response to these signals to control the engagement of lockup clutch 210, the transmission ratio of automatic transmission 300, and the like.

Figure 4:
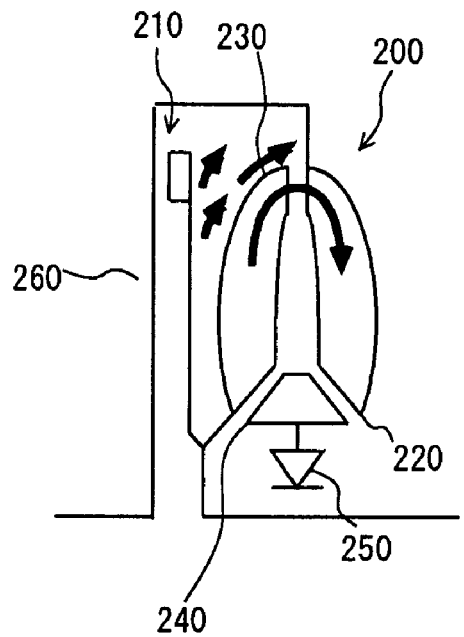
FIGS. 4 and 5 are first and second diagrams, respectively, showing directions in which ATF in a torque converter flows.

Reference will now be made to FIG. 2 to describe hydraulic circuit 500 adjusting hydraulic pressure provided to torque converter 200 to control the state of lockup clutch 210. Note that FIG. 4 shows only a portion of hydraulic circuit 500 that relates to the present invention.

Hydraulic circuit 500 includes an oil pump 510, a primary regulator valve 520, a secondary regulator valve 530, a solenoid modulator valve 540, and a lockup control valve 550.

Oil pump 510 is coupled to a crankshaft of engine 100. As the crankshaft rotates, oil pump 510 is driven to intake the ATF reserved in an oil pan 512 and thus cause hydraulic pressure which is in turn adjusted by primary regulator valve 520 to generate line pressure.

Secondary regulator valve 530 receives excessive working oil flowing out of (or discharged from) primary regulator valve 520 thereinto. Secondary regulator valve 530 generates secondary pressure.

Solenoid modulator valve 540 uses the line pressure as a source pressure to generate a solenoid modulator pressure which is in turn provided to a duty solenoid 560.

Lockup control valve 550 switches the recipient of the secondary pressure selectively between an oil chamber of torque converter 200 that is associated with engagement (or pump impeller 220) and that of the converter that is associated with disengagement (i.e., a space defined by lockup clutch 210 and the converter's cover 260).

Lockup control valve 550 receives hydraulic pressure from duty solenoid 560 and operates with the received hydraulic pressure as a pilot pressure. If duty solenoid 560 does not feed lockup control valve 550 with hydraulic pressure, lockup control valve 550 has a spool in a state as indicated in FIG. 2 by (1) (i.e., a state indicated on the left hand).

In that case, the secondary pressure is provided to the oil chamber of torque converter 200 that is associated with disengagement and the oil chamber of torque converter 200 that is associated with engagement has its hydraulic pressure provided to an oil cooler (not shown). This pulls lockup clutch 210 away from the converter's cover 260 and thus disengages lockup clutch 210.

If duty solenoid 560 feeds lockup control valve 550 with hydraulic pressure then lockup control valve 550 has the spool in a state as indicated in FIG. 2 by (2) (i.e., a state indicated on the right hand).

In that case, the secondary pressure is provided to the oil chamber of torque converter 200 that is associated with engagement and the oil chamber of torque converter 200 that is associated with disengagement has its hydraulic pressure drained out. This presses lockup clutch 210 against the converter's cover 260 and thus engages lockup clutch 210. Note that the force engaging lockup clutch 210 has a value depending on the hydraulic pressure provided from duty solenoid 560 to lockup control valve 550.

Duty solenoid 560 outputs pressure corresponding to a duty value indicated transmitted from ECT_ECU 1020. Thus the duty value indicated for duty solenoid 560 controls the force engaging lockup clutch 210, although how the force engaging lockup clutch 210 is controlled is not limited thereto.

Figure 3:
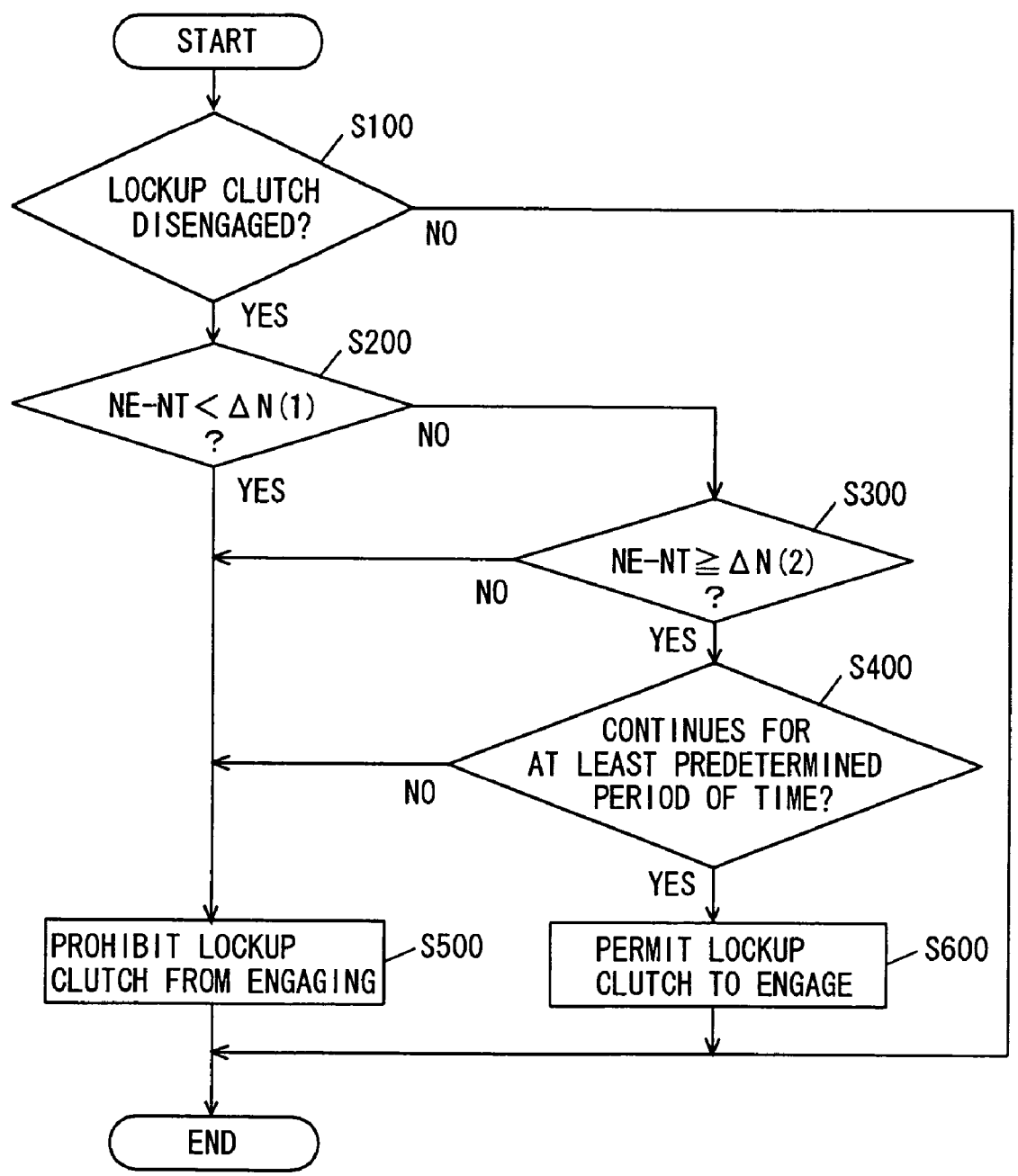
FIG. 3 is a flow chart of a structure of a program executed for control by an ECT_ECU corresponding to the control device of the present embodiment.

Reference will now be made to FIG. 3 to describe a structure of a program for control as executed by ECT_ECU 1020 of ECU 1000 corresponding to the control device of the present embodiment.

At step (hereinafter referred to as "S") 100 ECT_ECU 1020 determines whether lockup clutch 210 is disengaged or not. Whether lockup clutch 210 is disengaged or not may be determined for example from a duty value indicated transmitted from ECT_ECU 1020 to duty solenoid 560. If lockup clutch 210 is disengaged (YES at S100) the process proceeds to S200. Otherwise (NO at S100) the process ends.

At S200 ECT_ECU 1020 determines whether the number of revolutions NE of the input shaft of torque converter 200 (or the number of revolutions of the engine) minus the number of revolutions NT of the output shaft of torque converter 200 (or the number of revolutions of the turbine) is smaller than a threshold value $\Delta N$ (1). Note that whether the number of revolutions NE of the input shaft of torque converter 200 divided by the number of revolutions NT of the output shaft of torque converter 200 is smaller than a threshold value may be determined.

If the number of revolutions NE of the input shaft of torque converter 200 minus the number of revolutions NT of the output shaft of torque converter 200 is smaller than threshold value ΔN (1) (YES at S200) the process proceeds to S500. Otherwise (NO at S200) the process proceeds to S300.

At S300 ECT_ECU 1020 determines whether the number of revolutions NE of the input shaft of torque converter 200 minus the number of revolutions NT of the output shaft of torque converter 200 is equal to or larger than a threshold value ΔN (2). Note that whether the number of revolutions NE of the input shaft of torque converter 200 divided by the number of revolutions NT of the output shaft of torque converter 200 is equal to or larger than a threshold value may be determined.

If the number of revolutions NE of the input shaft of torque converter 200 minus the number of revolutions NT of the output shaft of torque converter 200 is equal to or larger than threshold value ΔN (2) (YES at S300) the process proceeds to S400. Otherwise (NO at S300) the process proceeds to S500.

At S400 ECT_ECU 1020 determines whether the number of revolutions NE of the input shaft of torque converter 200 minus the number of revolutions NT of the output shaft of torque converter 200 that is equal to or larger than threshold value ΔN (2) continues for at least a predetermined period of time.

If so (YES at S400) the process proceeds to S600. Otherwise the process proceeds to S500.

At S500 ECT_ECU 1020 prohibits engaging lockup clutch 210. Thereafter the process ends. At S600 ECT_ECU 1020 permits engaging lockup clutch 210. Thereafter the process ends.

In accordance with the above described structure and flow chart ECT_ECU 1020 corresponding to the control device of the present embodiment operates as will be described hereinafter.

When the vehicle is running and is also in a driven state (i.e., when automatic transmission 300 transmits driving force to engine 100), the number of revolutions NT of the turbine can become larger than the number of revolutions NE of the engine (or the number of revolutions of the pump) (or torque converter 200 can have its output shaft rotating ahead of its input shaft).

In this condition, as shown in FIG. 4, torque converter 200 has the ATF flowing therein from turbine runner 230 toward pump impeller 220. In that case, as seen at lockup clutch 210, the hydraulic pressure closer to turbine runner 230 becomes lower than that closer to the converter's cover 260. This exerts a force having a direction allowing lockup clutch 210 to be pulled away from the converter's cover 260, i.e., a force which decreases the force engaging lockup clutch 210.

In contrast, when the vehicle is in a driving state (i.e., when engine 100 transmits driving force to automatic transmission 300), the number of revolutions NE of the engine (or the number of revolutions of the pump) can become larger than the number of revolutions NT of the turbine (or torque converter 200 can have its input shaft rotating ahead of its output shaft).

Figure 5:
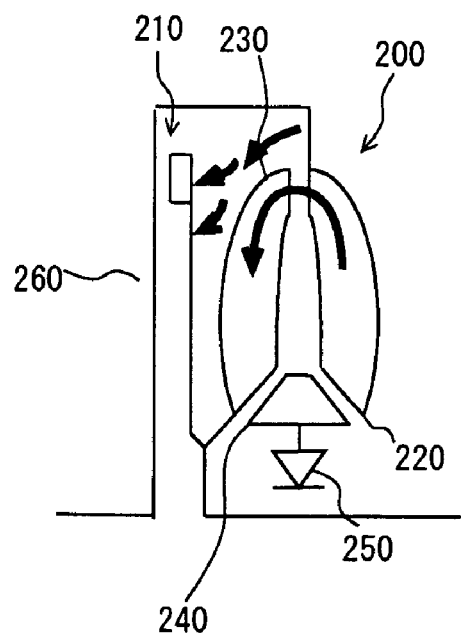

In this condition, as shown in FIG. 5, torque converter 200 has the ATF flowing therein from pump impeller 220 toward turbine runner 230. In that case, as seen at lockup clutch 210, the hydraulic pressure closer to turbine runner 230 becomes higher than that closer to the converter's cover 260. This exerts a force having a direction allowing lockup clutch 210 to be pushed against the converter's cover 260, i.e., a force which increases the force engaging lockup clutch 210.

As such for example if lockup clutch 210 is transitioning from disengagement to engagement, and the flow of the ATF varies in direction from a direction allowing the force pulling lockup clutch 210 away from the converter's cover 260 to act to a direction allowing the force pushing lockup clutch 210 against the converter's cover 260 to act, the force engaging lockup clutch 210 can rapidly increase. This causes lockup clutch 210 to rapidly engage and hence cause shock.

Accordingly, if lockup clutch 100 is disengaged (YES at S100) and the number of revolutions NE of the input shaft of torque converter 200 minus the number of revolutions NT of the output shaft of torque converter 200 is smaller than threshold value ΔN (1) (YES at S200), engaging lockup clutch 210 is prohibited (S500).

Thus, if the ATF flows in the direction allowing the force pulling lockup clutch 210 away from the converter's cover 260 to act, lockup clutch 210 can be maintained disengaged. This can alleviate or prevent the force engaging lockup clutch 210 rapidly increasing as the flow of the ATF rapidly varies while lockup clutch 210 is transitioning from disengagement to engagement. This can as a result alleviate or prevent rapid engagement of lockup clutch 210.

Subsequently, if the number of revolutions NE of the input shaft of torque converter 200 minus the number of revolutions NT of the output shaft of torque converter 200 is equal to or larger than threshold value ΔN (2) (YES at S300), and such condition does not continue for the predetermined period of time or longer (NO at S400), engaging lockup clutch 210 is prohibited (S500).

Thus if it can be said that the ATF has varied in direction to flow to push lockup clutch 210 against the converter's cover 260, and the flow of the ATF is considered still unstable in direction, lockup clutch 210 can be maintained in disengagement. This can alleviate or prevent the force engaging lockup clutch 210 rapidly increasing as the flow of the ATF rapidly varies while lockup clutch 210 is transitioning from disengagement to engagement. This can as a result alleviate or prevent rapid engagement of lockup clutch 210.

In contrast, if the number of revolutions NE of the input shaft of torque converter 200 minus the number of revolutions NT of the output shaft of torque converter 200 that is equal to or larger than threshold value ΔN (2) continues for at least the predetermined period of time (YES at S400), engaging lockup clutch 210 is permitted (S600). Thus, in a condition with the flow of the ATF considered stable in direction, engaging lockup clutch 210 can be started. This can alleviate or prevent rapid variation in the flow of the ATF while lockup clutch 210 is transitioning from disengagement to engagement, and as a result can alleviate or prevent the force engaging lockup clutch 210 that rapidly increases, and hence rapid engagement of lockup clutch 210.

The present embodiment can thus provide a control device or an ECT_ECU prohibiting a lockup clutch from engaging if the lockup clutch is disengaged, a torque converter has its output shaft rotating ahead of its input shaft, and ATF flows in a direction allowing a force pulling the lockup clutch away from the converter's cover to act. The lockup clutch can thus be maintained disengaged. This can alleviate or prevent the force engaging lockup clutch 210 rapidly increasing as the flow of the ATF rapidly varies while lockup clutch 210 is transitioning from disengagement to engagement. This can as a result alleviate or prevent rapid engagement of lockup clutch 210 and hence shock otherwise caused by such rapid engagement.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A control device for a friction engagement element provided internal to a fluid coupling that couples a power source and a transmission together to allow said fluid coupling to have input and output shafts thereof mechanically coupled together, comprising:
   an operation unit, wherein said operation unit controls a state of said friction engagement element, said operation unit determines whether said friction engagement element is disengaged, and if said friction engagement element is disengaged and a number of revolutions of said input shaft of said fluid coupling continues to be larger than that of revolutions of said output shaft of said fluid coupling for a period of time shorter than a predetermined period of time, said operation unit prohibits said friction engagement element from engaging.

2. The control device for said friction engagement element according to claim 1, wherein said operation unit permits said friction engagement element to engage if said friction engagement element is disengaged and said number of revolutions of said input shaft of said fluid coupling continues to be larger than that of revolutions of said output shaft of said fluid coupling for at least said predetermined period of time.

3. A control device for a friction engagement element provided internal to a fluid coupling that couples a power source and a transmission together to allow said fluid coupling to have input and output shafts thereof mechanically coupled together, comprising
   control means for controlling a state of said friction engagement element;
   determination means for determining whether said friction engagement element is disengaged; and
   prohibition means for prohibiting said friction engagement element from engaging if said friction engagement element is disengaged and a number of revolutions of said input shaft of said fluid coupling continues to be larger than that of revolutions of said output shaft of said fluid coupling for a period of time shorter than a predetermined period of time.

4. The control device for said friction engagement element according to claim 3, further comprising permission means for permitting said friction engagement element to engage if said friction engagement element is disengaged and said number of revolutions of said input shaft of said fluid coupling continues to be larger than that of revolutions of said output shaft of said fluid coupling for at least said predetermined period of time.

5. A method of controlling a friction engagement element provided internal to a fluid coupling that couples a power source and a transmission together to allow said fluid coupling to have input and output shafts thereof mechanically coupled together, comprising the steps of:
   controlling a state of said friction engagement element;
   determining whether said friction engagement element is disengaged; and
   prohibiting said friction engagement element from engaging if said friction engagement element is disengaged and a number of revolutions of said input shaft of said fluid coupling continues to be larger than a number of revolutions of said output shaft of said fluid coupling for a period of time shorter than a predetermined period of time.

6. The method of controlling said friction engagement element according to claim 5, further comprising the step of permitting said friction engagement element to engage if said friction engagement element is disengaged and said number of revolutions of said input shaft of said fluid coupling continues to be larger than a number of revolutions of said output shaft of said fluid coupling for at least said predetermined period of time.

* * * * *